April 17, 1945. T. B. RICHARDSON 2,373,781
MECHANICAL KITCHEN EQUIPMENT
Filed Feb. 27, 1942 5 Sheets-Sheet 1
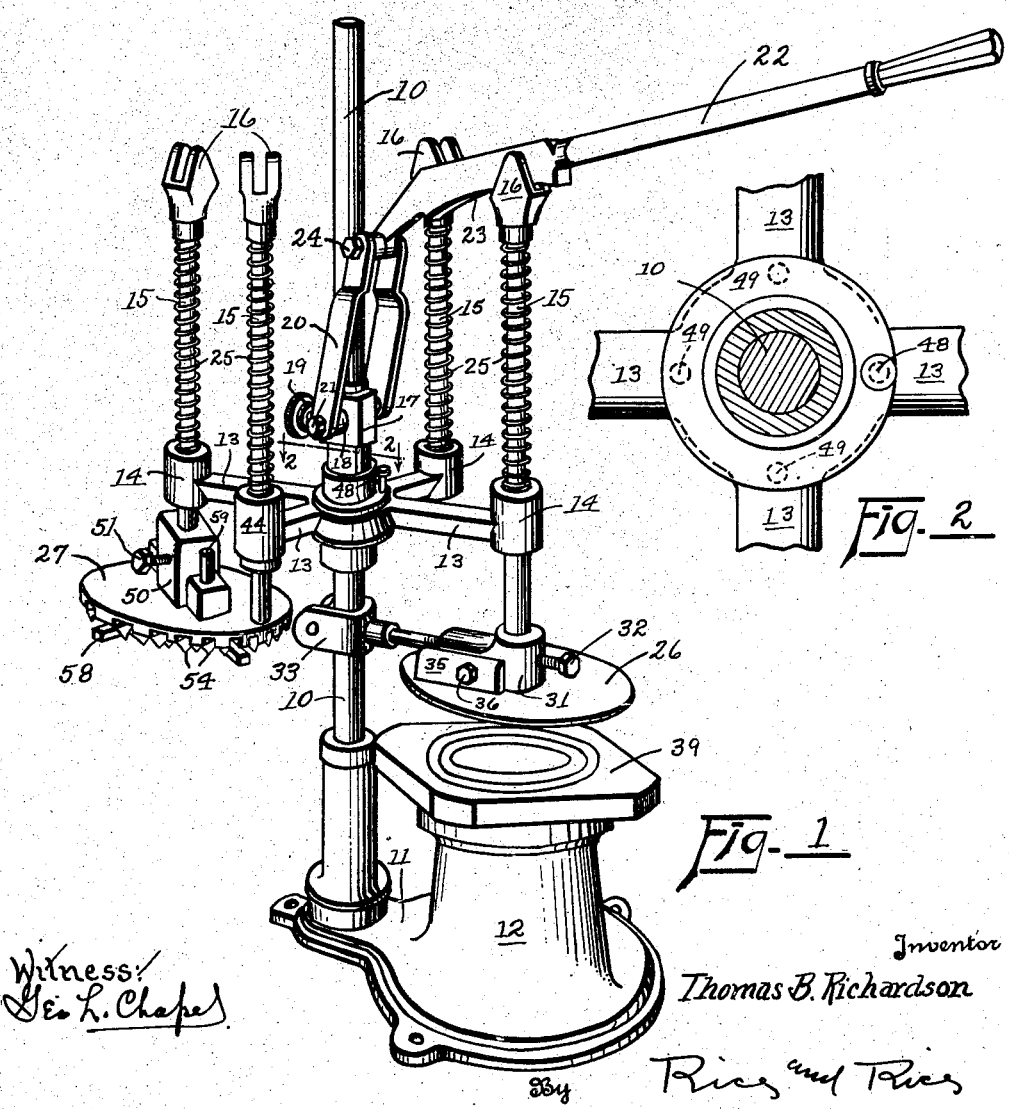
Inventor
Thomas B. Richardson

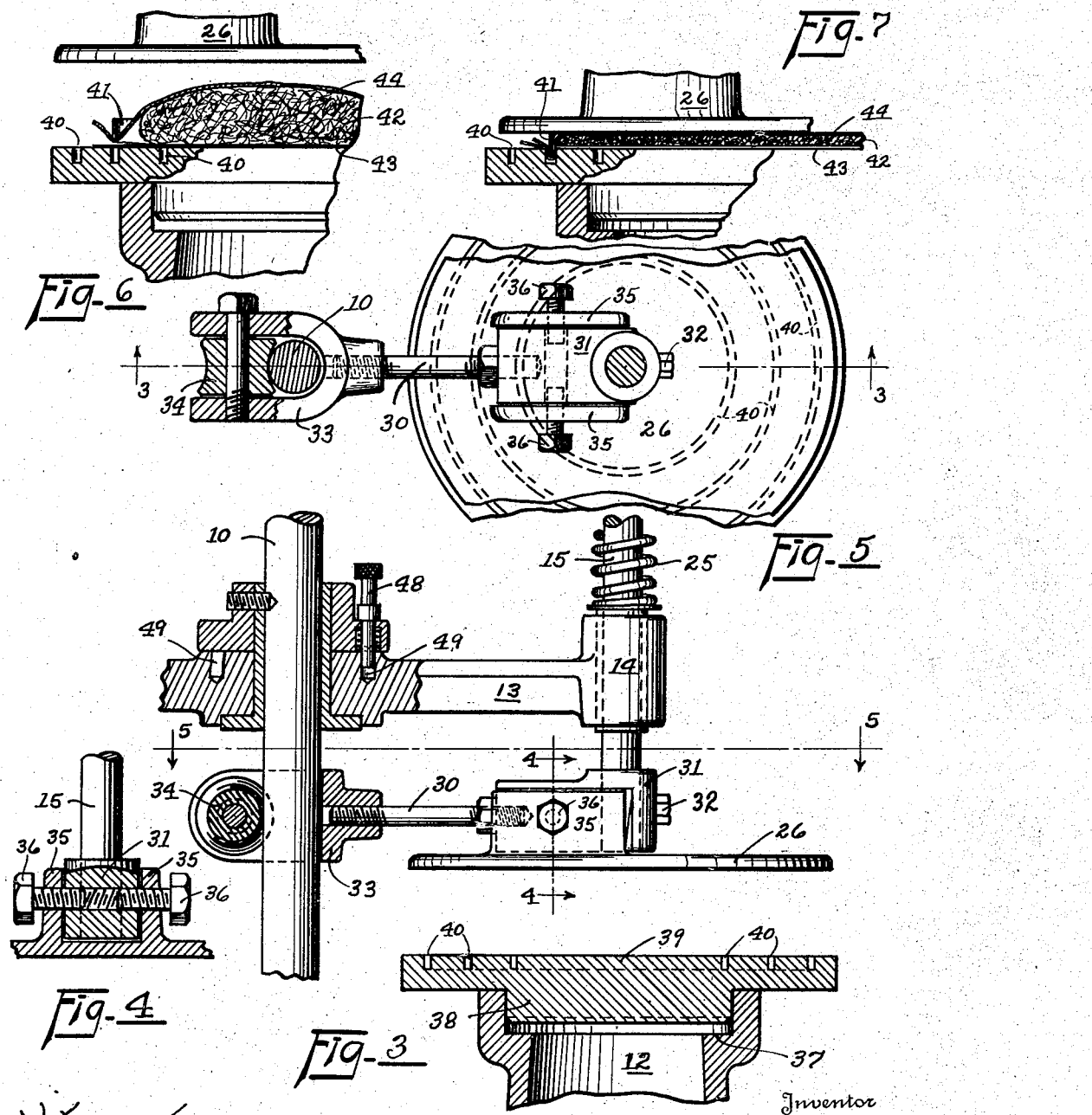

April 17, 1945.   T. B. RICHARDSON   2,373,781
MECHANICAL KITCHEN EQUIPMENT
Filed Feb. 27, 1942   5 Sheets-Sheet 3
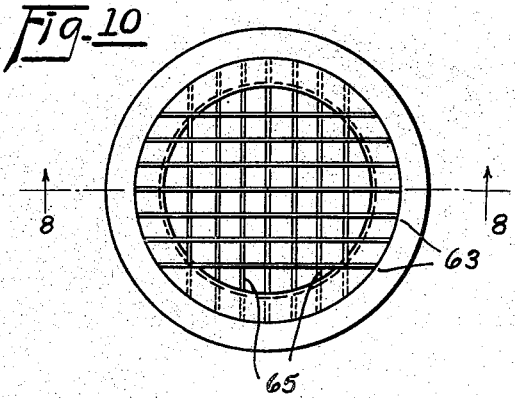
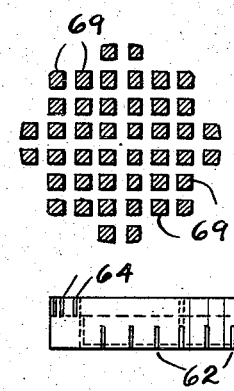
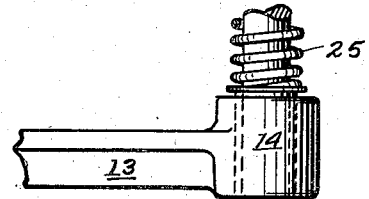
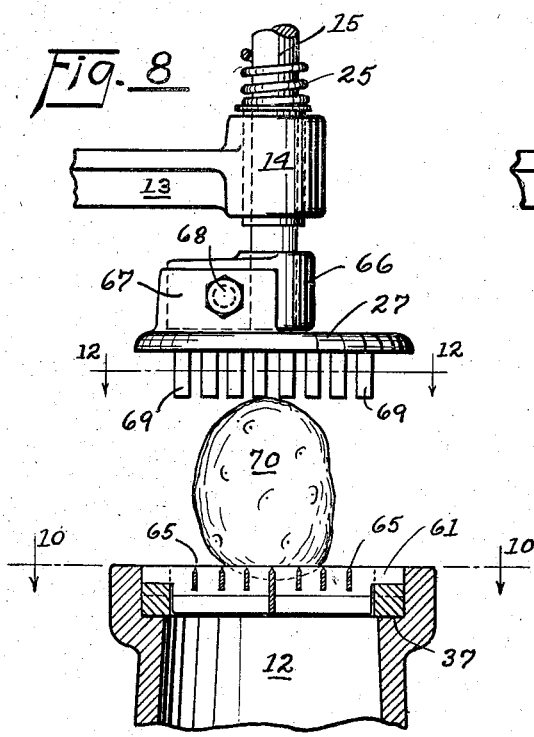
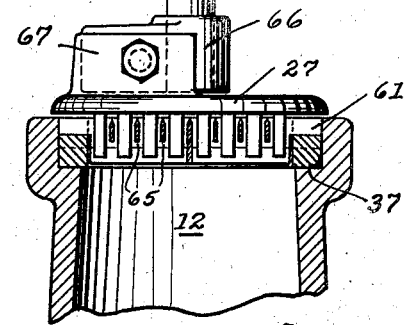
Inventor
Thomas B. Richardson
By Rice and Rice
Attorneys April 17, 1945. T. B. RICHARDSON 2,373,781
MECHANICAL KITCHEN EQUIPMENT
Filed Feb. 27, 1942 5 Sheets-Sheet 4
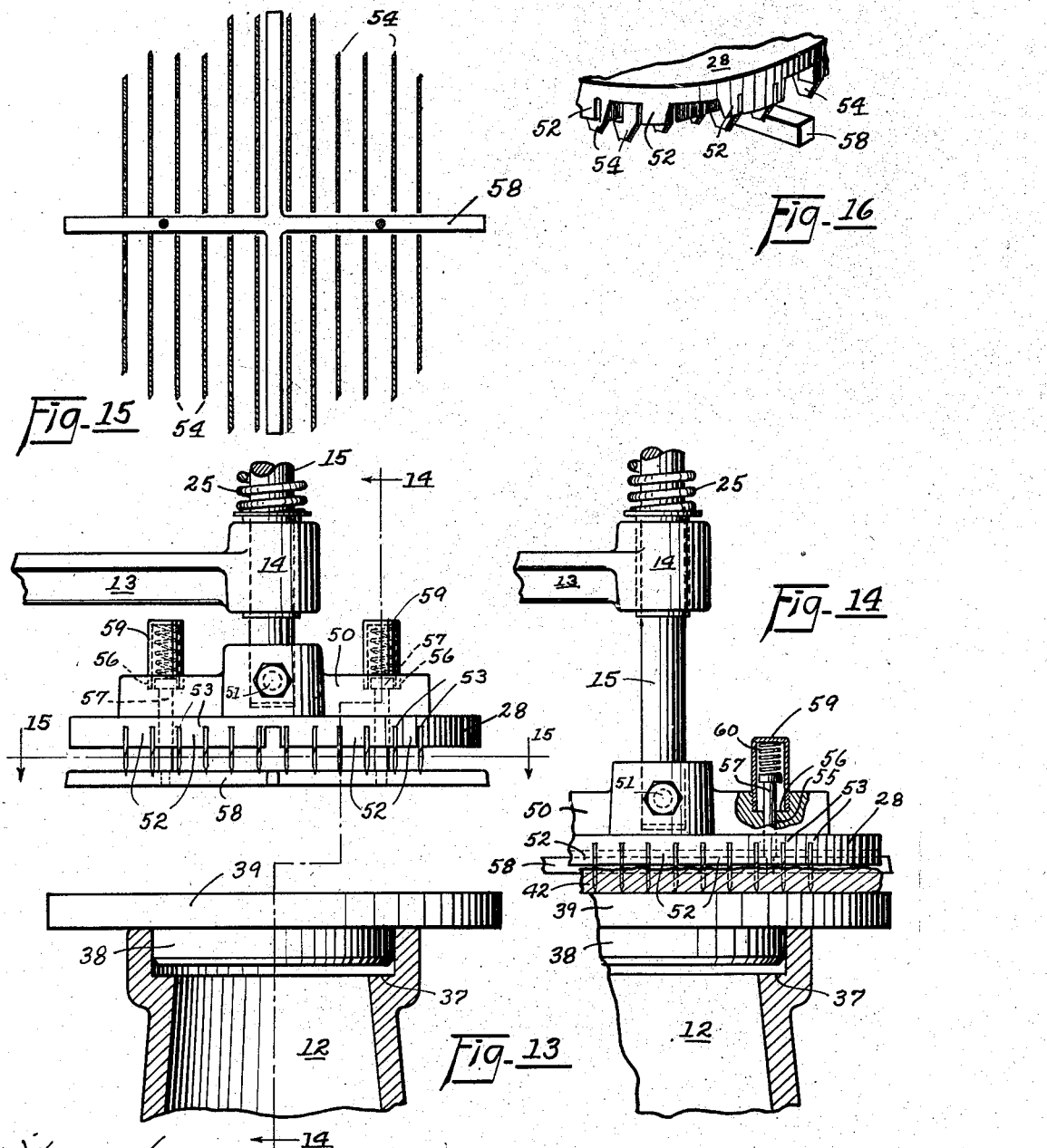
Inventor
Thomas B. Richardson

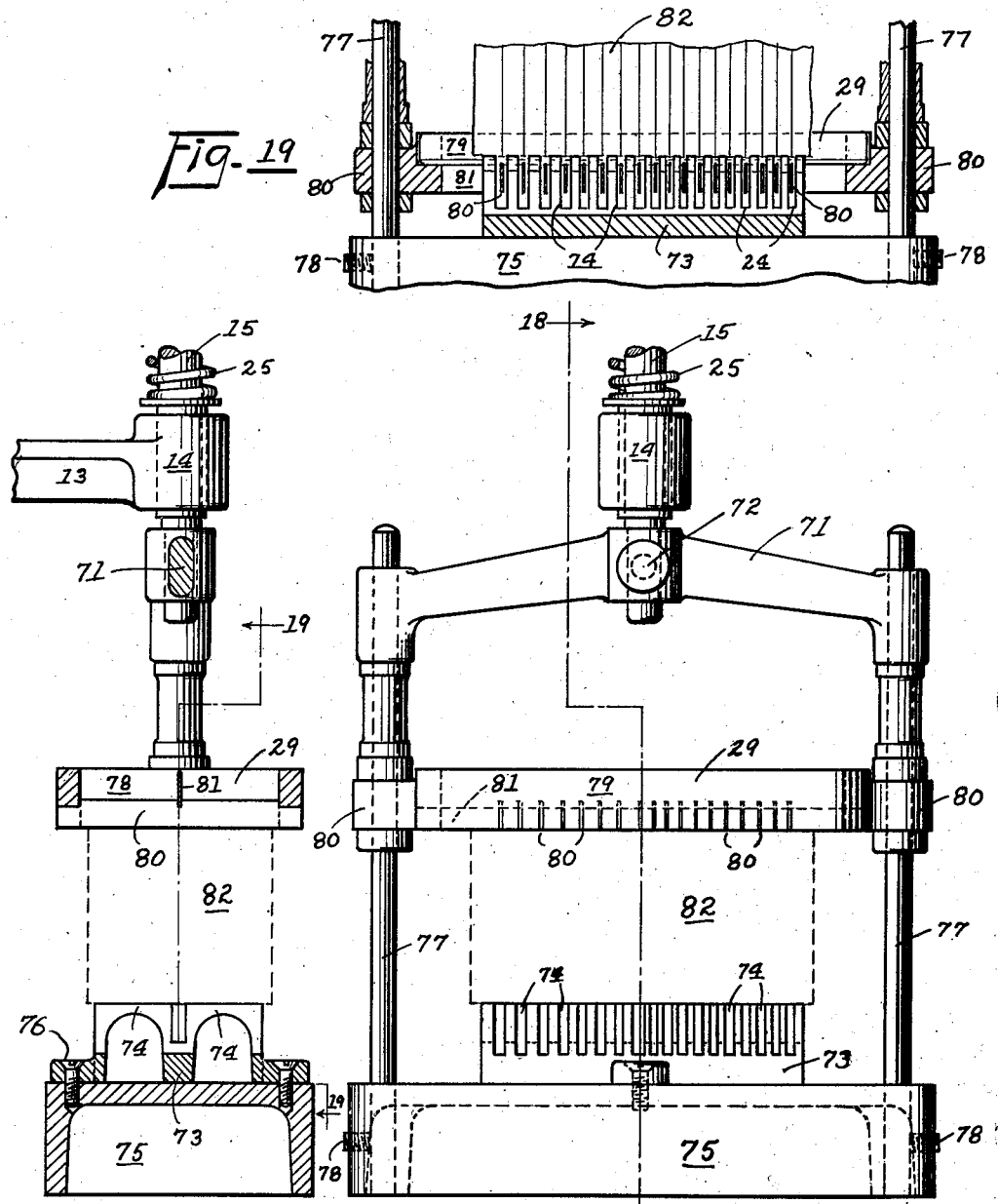

Patented Apr. 17, 1945

2,373,781

UNITED STATES PATENT OFFICE 2,373,781

MECHANICAL KITCHEN EQUIPMENT

Thomas B. Richardson, Big Rapids, Mich., assignor of one-fourth to Mike Limberis and one-fourth to George Epsimos, both of Big Rapids, Mich.

Application February 27, 1942, Serial No. 432,553

3 Claims. (Cl. 17—25)

The present invention relates to mechanical kitchen equipment and more particularly to such equipment as is especially adapted for use in hotel, institutional and restaurant kitchens.

The primary objects of the instant invention are to provide equipment of the general character above indicated which has a vertically disposed standard provided with a plurality of laterally disposed arms from each of which is suspended a vertically movable device operable by a lever for (1) cutting uncooked French fried potato or other vegetable blocks or cubes, (2) pressing meat into patty form, (3) tenderizing meat, (4) cutting butter into chips or slabs, (5) extracting juices from fruits, (6) mixing drinks, such as malted milks and the like, etc.; to provide such equipment which is convenient and utilitarian in use; to provide such equipment which may be readily and conveniently cleaned, making for sanitation in the kitchen; and, to provide such equipment which is reasonably economical in manufacture.

An illustrative embodiment of the invention is shown in the accompanying drawings, wherein:

Figure 1 is a perspective view of the lever operated mechanism showing a meat patty press and a meat tenderizer, both vertically slidably suspended from two of the four arms which project laterally from a vertically disposed standard;

Figure 2 is an enlarged sectional view thereof on line 2—2 of Figure 1;

Figure 3 is an enlarged sectional view of the meat patty press and its table on line 3—3 of Figure 5;

Figure 4 is a sectional view thereof on line 4—4 of Figure 3;

Figure 5 is a sectional view on line 5—5 of Figure 3;

Figure 6 is a fragmentary elevational view of the meat patty press and its table prior to compressing the meat into patty form and partly in section to better illustrate the manner in which the meat is compressed between a pair of waxed paper sheets;

Figure 7 is a view similar to Figure 6 but showing the press moved to meat compressing position relative to its table;

Figure 8 is an elevational view of the raw vegetable cutter and its table on line 8—8 of Figure 10 and showing the position of the cutter prior to cutting a raw potato or other vegetable into cubes or blocks preparatory to cooking the same;

Figure 9 is a view similar to Figure 8 but showing the position of the cutter relative to its table after the raw vegetable has been diced or cut into blocks;

Figure 10 is a plan view of the table and its knives on line 10—10 of Figure 8;

Figure 11 is an elevational view of the detachable ring and its knives adapted to be seated within the annular recess of the table shown in Figures 8-10;

Figure 12 is a sectional view on line 12—12 of Figure 8;

Figure 13 is an enlarged elevational view of the meat tenderizer and its table showing the position of its head knives prior to its downward vertical movement toward the table;

Figure 14 is a view similar to Figure 13 and on line 14—14 of Figure 13 but showing the position of the head knives relative to the meat supporting table upon which the meat is tenderized;

Figure 15 is a sectional view on line 15—15 of Figure 13;

Figure 16 is a fragmentary perspective view of the head knives of the meat tenderizer shown in Figures 13-15;

Figure 17 is a side elevational view of the cutter for cutting butter chips or slabs;

Figure 18 is a sectional view thereof on line 18—18 of Figure 17; and

Figure 19 is a sectional view on line 19—19 of Figure 18 but showing the knife head of the butter chip cutter in its depressed position.

Referring then to the drawings wherein like parts of the device shown are designated by the same numerals in the several views, a vertically disposed standard 10 is rigidly secured to a horizontally disposed ear 11 integrally formed with the base of a vertically tubular table supporting member 12, best shown in Figure 1.

The standard 10 is provided with a plurality of laterally disposed arms 13 intermediate its length which arms are each provided with a vertically tubular hub 14 and a rod 15, circular in cross section and having a bifurcated head 16, is vertically slidably embraced within each tubular hub 14, again all as best shown in Figure 1.

A tubular block 17 having opposite laterally disposed and integrally formed arms 18, each provided with a screw threaded bore, embraces the standard 10 and is vertically slidably adjustable on the standard 10 above its laterally disposed arms 13 by means of a set screw 19 seated within a laterally screw threaded bore within the block 17, likewise best shown in Figure 1.

The opposite inner ends of a clevis 20 embrace the outer ends of the arms 18 to which arms the clevis is pivotally connected by bolts 21 screw threadedly seated within the screw threaded bores of said arms, and a lever 22 having a cammed surface 23 adapted to be selectively seated within any of the bifurcated heads 16 of a rod 15 as hereinafter explained, is pivotally connected to the outer end of the clevis 20 by means of bolt 24 (Figure 1).

A coiled expansion spring 25 embracing each rod 15 is interposed between its embracing hub 14 and its bifurcated head 16 and (1) a meat patty press 26 such as is best shown in Figures 3-7, (2) a raw vegetable cutter 27 such as is best shown in Figures 8-12, (3) a meat tenderizer 28 such as is best shown in Figures 13-16, or (4) a butter chip cutter 29 such as is best shown in Figures 17-19, are each adapted to be secured to the lower end of a rod 15, each in the manner now to be described.

Referring first to the meat patty press 26, best shown in Figures 3-7, a laterally disposed arm 30 has a head 31 provided with a vertical bore within which the lower end of the rod 15 is seated and to which it is secured by a set screw 32. The inner end of the arm 30 is provided with a bifurcated tail 33, loosely embracing the standard 10, and a roller 34 carried by the bifurcated tail 33 of the arm 30 engages the standard 10.

The patty press 26 is provided with a pair of spaced vertically projecting ears 35 which embrace the opposite sides of the head 31 and set screws 36 tiltably secure the press 26 thereto, all as best shown in Figures 3-5.

The tubular table supporting member 12 is provided with an annular recess 37 within which the hub 38 of a wooden table 39 may be seated as best shown in Figures 3, 6 and 7 and the upper surface of the table is provided with a plurality of varying sized axial concentric grooves 40, each adapted to seat a circular meat patty former 41 therein.

Thus in forming a meat patty by the patty press 26, ground meat 42, such as round steak, sausage, pork or the like, is placed on a sheet of waxed paper 43 disposed on the table 39, over which another sheet of waxed paper 44 is placed. A patty former 41 of selected size, depending upon the size of the patty it is desired to form, is then placed on the upper sheet of waxed paper 44 in registration with its fitting groove 40, and as best shown in Figure 6.

Manual depressing of the lever 22 from its position shown in Figure 1 causes the patty press 26 to move from its position there shown and as shown in Figure 6 to its position shown in Figure 7 to form a raw meat patty. Upon release of the lever 22, the coiled expansion spring 25 lifts the patty press 26, after which the meat patty thus formed may be removed from the table 39, permitting the forming thereafter of another meat patty and in the same manner as is above described.

In instances wherein it is desired to tenderize meat, the meat tenderizer 28 shown in Figure 1 but in better detail in Figures 13-16, is rotated from its position shown in Figure 1 to a position above the table 39. In other words the meat tenderizer is rotated to the position occupied by the meat patty press 26 as the same is shown in Figure 1.

The selected rotated operable position of the meat patty press 26, meat tenderizer 28, vegetable cutter 27 (Figures 8-12) or butter chip cutter 29 (Figures 17-19) is governed by the manually operable, vertically disposed spring actuated pin 48 located adjacent the inner end of one of the laterally disposed arms 13 (Figures 1-3) and its inner end is adapted to seat within a well 49 of an arm 13 when in registration therewith, preventing rotation of the arms when thus seated.

Thus in instances wherein it is desired to use the meat tenderizer 28 rather than the meat patty press 26, the pin 48 is manually lifted, permitting rotation of the meat tenderizer from its position shown in Figure 1 to a position above the table 39, at which time the pin is released to seat within its well 49, preventing rotation of arms 13 until the pin is again withdrawn.

The meat tenderizer 28 comprises a flat horizontally disposed plate to whose upper surface is secured a block 50 provided with a centrally disposed vertical bore which embraces the lower end of its rod 15 and a set screw 51 is provided to secure the block 50 and its plate to the rod.

The under surface of the plate is provided with a plurality of spaced depending and parallelly disposed ridge portions 52, each provided with a series of spaced and parallelly disposed transverse knife blade receiving slots 53 and a saw toothed knife blade 54 is seated within each aligned transverse series of slots, all as best shown in Figures 13, 14 and 16.

The opposite sides of the block 50 are each provided with a vertical bore 55 extending through the plate to which it is secured, the upper end of each bore being provided with an annular groove 56 adapted to engage the bolt head of a bolt 57 disposed within each bore and to prevent the bolt from falling out of its bore.

The bolts 57 are in screw threaded or other engagement with a cruciform member 58 disposed between the knife blades 54 as shown in Figure 15 and a tubular cap 59 having a coiled expansion spring 60 seated therein, is secured in screw threaded engagement above each bore 55 as best shown in Figures 13 and 14.

Thus in instances wherein it is desired to use the meat tenderizer 28, the meat 42 to be tenderized is placed upon the table 39, whereupon the manual depressing of the lever 22 causes the meat tenderizer 28 to move from its position shown in Figure 13 to its position shown in Figure 14. The knife blades 54 thus break the meat fibres and upon the release of the lever, the cruciform member 58 is urged downwardly by the coiled expansion springs 60 to release the meat from the knife blades after which the same operation may be resumed.

In instances wherein it is desired to use the raw vegetable cutter 27 (Figures 8-12), the table 39 is removed from the annular recess 37 of the tubular supporting member 12 and the ring member 61 is replaced therefor. The opposite upper surfaces of the ring member are provided with a plurality of spaced vertically disposed aligned slots 62 within each opposite pair of which is seated a knife blade 63 whereas the opposite under surfaces of the ring member are provided with similar but transversely disposed slots 64 within each opposite pair of which is seated a knife blade 65, all as best shown in Figures 10 and 11.

The rod 15 for the vegetable cutter 27 is provided with a head 66 like the head 31 of the patty press 26 and is secured to its rod 15 at the lower end thereof. The cutter has a pair of spaced vertically disposed ears 67 which embrace and are secured to the head 66 by the bolt 68.

The under surface of the cutter 27 is provided with a plurality of depending parallel spaced blocks 69 of the character best shown in Figure 12 which blocks register between the sets of transversely disposed knife blades 63, 65, as best shown in Figure 9, when the cutter 27 is moved to that position from its position shown in Figure 8.

Thus in instances wherein it is desired to use the raw vegetable cutter 27, a raw vegetable 70 such as a potato is placed on the knife blades 63, 65 of the ring member 61 whereupon the manual depressing of the lever 22 causes the cutter to move from its position shown in Figure 8 to its position shown in Figure 9, cutting the vegetable into cubes or blocks which drop through the tubular supporting member 12.

In instances wherein it is desired to use the butter chip cutter 29 (Figures 17-19), a generally horizontally disposed bridge member 71 is provided with a centrally disposed vertical bore which embraces its rod 15 and to which it is secured by a set screw 72 and each of the opposite ends of the bridge member is likewise provided with a vertical bore.

A block 73 having a plurality of vertically disposed teeth 74 of arched formation as best shown in Figure 18 and which teeth are divided centrally longitudinally, is secured to the upper surface of a base member 75 by machine screws 76.

The opposite ends of the base member 75 are each provided with a vertical bore within which is seated a post 77 secured therein by a set screw 78, the upper ends of which posts are slidably embraced by the vertical outer bores of the bridge member 71.

A knife head 79 is provided at each of its opposite ends with an ear 80, each having a vertical bore slidably embracing a post 77, which knife head 79 is provided with a plurality of spaced, transversely, aligned slots on its opposite under surfaces within each of which opposite aligned slots a knife blade 80 is retained. Each of the opposite ends of the knife head 79 is provided with a slot along its upper surface medially of its width and a knife blade 81 is retained therein.

Thus in instances wherein it is desired to cut a pound of butter 82, the same is placed on the block 73 and below the knife head 79, as indicated in Figures 17 and 18, whereupon the manual depressing of the lever 22, causes the knife head 79 to move from its positions shown in Figures 17 and 18 to its position shown in Figure 19, resulting in cutting the butter into chips or slabs. Releasing the lever 22, elevates the bridge member 71 after which the knife head 79 may be manually lifted and the butter chips removed preparatory to a new operation.

Fruit juice extractors, drink mixers and the like may be substituted for any of the several devices herein illustrated and while but several embodiments of the invention have been herein shown and described, it will be understood that certain details of the constructions shown may be altered or omitted without departing from the spirit of the invention as the same is defined by the following claims.

I claim:

1. A machine of the class described comprising a base, a vertically disposed standard secured to the base and provided with a laterally disposed arm extending over the base and provided with a hub having a bore, a table top seated on the base and located beneath the outer end of said arm, a vertically disposed rod slidable in said bore and provided at its upper end with a head and having a plate located at its lower end, said plate being provided with spaced groups of knives spaced apart, the spaces between the groups of knives being diametrically arranged, a coiled expansion spring disposed on the rod and interposed between the head thereof and said arm for normally maintaining the rod in an elevated position, a hand lever pivoted to the standard and arranged to engage the head of the rod for moving the latter downwardly, a cruciform stripping member slidably connected with said plate and having its arms located within the spaces between the groups of knives, and spring means for urging the cruciform stripping member downwardly with respect to said plate.

2. A machine of the class described comprising a base, a vertically disposed standard secured to the base and provided with a laterally disposed arm extending over the base and provided with a hub having a bore, a table top seated on the base and located beneath the outer end of said arm, a vertically disposed rod slidable in said bore and provided at its upper end with a head and having a plate located at its lower end, said plate being provided with spaced groups of knives spaced apart, the spaces between the groups of knives being diametrically arranged, a coiled expansion spring disposed on the rod and interposed between the head thereof and said arm for normally maintaining the rod in an elevated position, a hand lever pivoted to the standard and arranged to engage the head of the rod for moving the latter downwardly, a cruciform stripping member having arms arranged in the spaces between the groups of blades, fastening devices piercing the said plate and provided at their upper ends with heads and secured at their lower ends to the stripping member whereby the stripping member is slidably connected with the plate, tubular caps mounted on said plate and receiving the upper portions of the fastening devices, and expansion springs housed within the tubular caps and interposed between the same and the heads of the fastening devices and arranged to move the stripping member downwardly for stripping meat from the knives.

3. A machine of the class described comprising a base, a vertically disposed standard secured to the base and provided with a laterally disposed arm extending over the base and provided thereat with a hub having a vertical bore, a table top seated on the base, a vertically disposed rod slidably embraced within the bore and provided at its upper end with a head, a spring for urging the rod upwardly, a hand lever pivoted to the standard and arranged to engage the head of the rod for moving the latter downwardly, a plate carried by the lower end of the rod and provided at its lower face with a plurality of spaced depending and parallelly disposed ridge portions, each provided with a series of spaced parallelly disposed transverse knife blade receiving slots, a saw-toothed knife blade seated within each aligned transverse series of slots, and a spring actuated meat releasing member slidably mounted on said plate for upward and downward movement and movable within the plate to a position substantially above the effective portions of the knife blades when the rod is at the limit of its downward movement.

THOMAS B. RICHARDSON.